United States Patent
Michel et al.

(10) Patent No.: US 12,142,148 B2
(45) Date of Patent: Nov. 12, 2024

(54) TECHNOLOGY FOR BALANCING JOURNEYS OF MOTOR VEHICLES

(71) Applicant: MAN Truck & Bus SE, Munich (DE)

(72) Inventors: Britta Michel, Munich (DE); Christiane Wölfel, Munich (DE); Veronika Hutmann, Munich (DE)

(73) Assignee: MAN Truck & Bus SE, Munich (DE)

( * ) Notice: Subject to any disclaimer, the term of this patent is extended or adjusted under 35 U.S.C. 154(b) by 35 days.

(21) Appl. No.: 17/602,499

(22) PCT Filed: Mar. 17, 2020

(86) PCT No.: PCT/EP2020/057203
§ 371 (c)(1),
(2) Date: Oct. 8, 2021

(87) PCT Pub. No.: WO2020/207716
PCT Pub. Date: Oct. 15, 2020

(65) Prior Publication Data
US 2022/0215757 A1    Jul. 7, 2022

(30) Foreign Application Priority Data
Apr. 8, 2019   (DE) .................. 10 2019 109 133.0

(51) Int. Cl.
*G08G 1/00* (2006.01)
*H04W 4/44* (2018.01)

(52) U.S. Cl.
CPC .............. *G08G 1/22* (2013.01); *G08G 1/20* (2013.01); *H04W 4/44* (2018.02)

(58) Field of Classification Search
CPC ....... G08G 1/096805; G08G 1/096811; G08G 1/096816; G08G 1/22; G08G 1/20; G01C 21/3407; H04W 4/44; B60W 30/165
See application file for complete search history.

(56) References Cited

U.S. PATENT DOCUMENTS

| 12,013,246 B2 * | 6/2024 | Cope ................. G01C 21/3438 |
| 2014/0302774 A1 * | 10/2014 | Burke ...................... G07C 5/08 |
| | | 455/3.05 |

(Continued)

FOREIGN PATENT DOCUMENTS

| CN | 202394091 U | 8/2012 |
| CN | 106525058 A | 3/2017 |

(Continued)

OTHER PUBLICATIONS

German Search Report issued in German Patent application No. 102019109133.0 dated Dec. 11, 2019. English translation not available.

(Continued)

*Primary Examiner* — Aniss Chad
*Assistant Examiner* — Christopher George Fees
(74) *Attorney, Agent, or Firm* — Weber Rosselli & Cannon LLP

(57) ABSTRACT

A device for balancing journeys of motor vehicles in order to form a vehicle train includes a guiding vehicle and at least one following vehicle, which is longitudinally and laterally guided by the guiding vehicle. The device includes a user unit, which is designed to capture data of a journey of a motor vehicle, a radio unit designed to receive data of an additional journey of at least one additional motor vehicle, a balancing unit which exchanged data with the user unit and the radio unit and is designed to output, at the user unit, a correspondence between the captured data of the journey of the motor vehicle and the received data of the additional journey of the at least one additional motor vehicle, the data including a route and associated driving times of the journey.

16 Claims, 4 Drawing Sheets

(56) References Cited

U.S. PATENT DOCUMENTS

| | | | |
|---|---|---|---|
| 2017/0293296 A1* | 10/2017 | Stenneth | G06Q 20/10 |
| 2018/0211545 A1 | 7/2018 | Smartt et al. | |
| 2019/0064848 A1* | 2/2019 | Hofsaess | H04W 4/44 |
| 2019/0236959 A1* | 8/2019 | Belapurkar | G08G 1/22 |
| 2019/0339716 A1* | 11/2019 | Kopischke | G08G 1/22 |
| 2020/0264634 A1* | 8/2020 | Hadi | B60W 60/0023 |
| 2020/0298882 A1* | 9/2020 | Kobayashi | B60W 60/0025 |

FOREIGN PATENT DOCUMENTS

| | | |
|---|---|---|
| CN | 107403547 A | 11/2017 |
| CN | 108352110 A | 7/2018 |
| DE | 102015002404 A1 | 8/2016 |
| DE | 102016003432 A1 | 10/2016 |
| DE | 112015001150 | 11/2016 |
| DE | 102015209592 A1 | 12/2016 |
| DE | 102016212905 A1 | 1/2018 |
| DE | 102017214784 A1 | 2/2019 |

OTHER PUBLICATIONS

PCT Search Report and Written Opinion issued in PCT Application No. PCT/EP2020/057203 dated Jul. 1, 2020.
Second Chinese Office Action issued in Chinese Patent Application No. 202080026712.4 dated Sep. 7, 2023 with English translation.
Chinese Office Action issued in Chinese Patent Application No. 202080026712.4 dated Mar. 10, 2023. English translation not available.

* cited by examiner

TECHNOLOGY FOR BALANCING JOURNEYS OF MOTOR VEHICLES

CROSS-REFERENCE TO RELATED APPLICATIONS

This application is a 371 application of PCT/EP2020/057203 filed Mar. 17, 2020, which claims benefit of and priority to German Patent Application Serial No. DE102019109133.0 filed Apr. 8, 2019, the disclosures of the above-identified applications are hereby incorporated by reference in their entirety.

The present disclosure relates to a device for comparing journeys of motor vehicles, in particular utility vehicles, so as to form a vehicle group. Also disclosed is a motor vehicle, in particular utility vehicle, equipped with a corresponding device, and a central computer communicating with the device.

In the coming years, increasing use will be made of platooning, in particular on freeways and in freight travel. Platooning denotes the travel of multiple motor vehicles (in particular utility vehicles) close behind one another in a vehicle group, this also being able to be referred to as a platoon or convoy. The driver of the lead vehicle (that is to say of the vehicle at the front) is responsible for guiding all of the other motor vehicles in the vehicle group, these being referred to as following vehicles. The drivers of the following vehicles are thereby relieved from the driving task for the duration of travel in the vehicle group.

A system of control systems that span the vehicles makes it possible to perform various driving maneuvers, in particular braking procedures, acceleration procedures or lane changes, in a synchronous manner. One significant advantage of platoon journeys for utility vehicles is reduced fuel consumption, for example by around 10%, achieved by slipstreaming, this resulting from the small distances, for example around 15 meters, between the vehicles in the group. Furthermore, depending on the degree of automation of the vehicles involved, the drivers may devote themselves to an additional task, thereby achieving further cost and time savings. Technical driver assistance systems and control systems for automated longitudinal and transverse guidance and electronic coupling, that is to say communication between all of the vehicles involved, are essential for platooning.

The vehicle group may consist of multiple motor vehicles, in particular utility vehicles, of different vehicle types, different manufacturers or different trucking companies. The vehicle types include for example semitrailers, trucks and transporters. Previous developments in the field of platooning functionalities have demonstrated the technical feasibility of such a vehicle group and implementation thereof in real traffic, in particular by networking the motor vehicles participating in the vehicle group with one another, implementing auxiliary systems for automated driving and display systems for displaying a vehicle group for surrounding road users. The technical feasibility of platooning was successfully demonstrated in April 2016 by European utility vehicle manufacturers in the "European Truck Platooning Challenge".

However, widespread use of the ecological, economical and logistical advantages of platooning is offset by the fact that a large number of in each case optimum vehicle groups have to be formed from the set of spatially separate vehicles and drivers acting independently of one another.

The object is thus that of specifying a technique for efficiently forming suitable or optimum vehicle groups.

This object is achieved by a device for comparing journeys of motor vehicles, in particular utility vehicles, so as to form a vehicle group, a corresponding motor vehicle, in particular utility vehicle, and a central computer designed to communicate with the device or the motor vehicle, in particular utility vehicle, having the features of the independent claims. Advantageous embodiments and applications of the disclosure are the subject of the dependent claims and are explained in more detail in the following description with partial reference to the figures.

According to one aspect of the disclosure, what is provided is a device for comparing journeys of motor vehicles, in particular utility vehicles, so as to form a vehicle group with a lead vehicle and at least one following vehicle guided longitudinally and transversely by the lead vehicle. The device comprises a user unit that is designed to record data of a journey of a motor vehicle, in particular utility vehicle. The device furthermore comprises a radio unit that is designed to receive data of a further journey from in each case at least one further motor vehicle, in particular utility vehicle. The device furthermore comprises a comparison unit that exchanges data with the user unit and the radio unit and that is designed to output a match between the recorded data of the journey of the motor vehicle, in particular utility vehicle, and the received data of the further journey of the at least one further motor vehicle, in particular utility vehicle, on the user unit. The data comprise a route and associated travel times of the respective journey. The further motor vehicle, in particular utility vehicle, and/or an associated driver may also be referred to as a platooning participant or platooning partner. The (for example existing or to be formed) vehicle group may also be referred to as a platoon or convoy. The journey of each motor vehicle, in particular utility vehicle, or the data of the journey of each motor vehicle, in particular utility vehicle, may comprise a combination of route and associated travel times. The journey may be a scheduled journey or a journey that has already begun. The data of each journey may in each case also be referred to as journey data. A journey in the vehicle group may also be referred to as a platoon journey. The route may also be referred to as travel route.

Exemplary embodiments of the device allow for example a driver of the motor vehicle (in particular a driver of the utility vehicle) or a dispatcher of multiple motor vehicles (in particular utility vehicles) to use a technical system to search for and to find one or more platooning participants or an existing platoon on the basis of defined and/or individual selection criteria. For an efficient and above all safe platoon journey, the match may be determined depending on basic information, for example about scheduled routes of the further motor vehicle (in particular utility vehicle), type of load of the respective further motor vehicle, in particular utility vehicle, and/or platooning experience of the respective driver. In other words, basic information may be received and compared with criteria for the selection of the one or more correct platooning partners, for example for the purpose of building up confidence, driving safely in the vehicle group and driving together in the vehicle group for as long as possible.

The same or further exemplary embodiments of the device allow an optimized selection of one or more platooning partners (that is to say the participants involved in the platoon) and/or rapid and optimum formation of the vehicle group.

The match with the further journey of the at least one further motor vehicle, in particular utility vehicle, may be output (for example displayed) in response to an input of the at least one minimum requirement. Exemplary embodiments of the device may make it possible to search for an optimum platooning partner. The output (for example the display) may allow selection of the optimum platooning partner, for example by the driver of the motor vehicle (in particular utility vehicle). The search may be performed in accordance with defined and/or individual criteria by virtue of the inputting of the at least one minimum requirement and/or the selection.

Exemplary embodiments of the device allow the driver, before or during the journey, to search for possible platooning partners and/or existing platoons directly himself in order to increase efficiency (for example in terms of fuel consumption of the motor vehicle, in particular utility vehicle, and/or time for an additional task during travel as following vehicle). By way of example, the driver himself is at the center of the selection and definition of the criteria and is able to individually configure the search in accordance with his requirements.

The fuel saving may be achieved in particular in the case of utility vehicles. Driving in the vehicle group may offer the motor vehicle other or further advantages. By way of example, it is possible to unburden the driver and/or achieve increased safety by reducing response times in the event of emergency braking maneuvers.

The match may be determined locally, for example by the comparison unit, or be received in communication with a central computer (for example by way of the radio unit). The match may be a result of a comparison of the recorded and received data. By way of example, the match may be the result of a comparison between the data with regard to matching properties of the journey, in particular the respective motor vehicles (in particular utility vehicles) and/or the respective drivers. The properties on which the match is based may relate to, for example allow, the formation of the vehicle group.

The comparison may comprise a rating of a driver of the respective further motor vehicle, in particular utility vehicle. By way of example, a minimum rating may be a requirement for the comparison and/or the outputting of the match.

The recording of the journey data may comprise receiving, inputting or creating the journey data. The journey data may be received in the motor vehicle, in particular utility vehicle, for example from a dispatcher. The travel time may comprise a departure time, arrival time, a travel duration and/or a time range of the departure time, the arrival time and/or the travel duration.

The match may depend on a length of the matching routes during matching travel times. The length may be measured in terms of space and/or in terms of time. The match may be a sum of multiple features (or properties) of the respective motor vehicles (in particular utility vehicles) and/or of the respective drivers.

The user apparatus may furthermore be designed, in response to the outputting of the match with the at least one further motor vehicle, in particular utility vehicle, to record consent to form the vehicle group with the at least one further motor vehicle, in particular utility vehicle, and to transmit the recorded consent to the at least one further motor vehicle, in particular utility vehicle, by way of the radio unit.

The device may furthermore be designed, in response to the recorded consent, to configure a control system of the motor vehicle, in particular utility vehicle, for longitudinal and transverse guidance on the basis of the received data of the at least one further motor vehicle, in particular utility vehicle.

A device integrated into the motor vehicle, in particular utility vehicle, may exchange data with the control system of the motor vehicle, in particular utility vehicle, in order to configure the control system. A device implemented by way of a mobile telephone may transmit the received data of the respective further motor vehicle, in particular utility vehicle, to the control system of the motor vehicle, in particular utility vehicle, for longitudinal and transverse guidance via a mobile radio interface.

The radio unit may exchange control data with a control system of the motor vehicle, in particular utility vehicle, for longitudinal and transverse guidance. The radio unit may furthermore be designed to receive the control data for the longitudinal and transverse guidance from the lead vehicle or to transmit them to the at least one following vehicle. By way of example, the journey data of the further motor vehicle, in particular utility vehicle, may be received by the same radio unit or the recorded journey data may be transmitted by the same radio unit that is also designed to receive or transmit the control data for the longitudinal and transverse guidance.

The radio unit may receive the data of the further journey and/or consent directly from the respective further motor vehicle, in particular utility vehicle. As an alternative or in addition, the radio unit or the user unit may be designed to transmit the recorded data and/or recorded consent directly to the respective further motor vehicle, in particular utility vehicle.

As an alternative or in addition, the radio unit may receive the data of the further journey and/or consent of the at least one further motor vehicle, in particular utility vehicle, from a central computer. As an alternative or in addition, the radio unit or the user unit may be designed to transmit the recorded data and/or recorded consent to the central computer.

The comparison unit may be designed to output matches with multiple further motor vehicles, in particular utility vehicles, in a manner sorted in accordance with a degree of the respective match.

The data may furthermore specify or identify a motor vehicle, in particular utility vehicle, or a vehicle type of the respective journey (for example by way of a type identifier). The match may comprise a compatibility of the motor vehicle, in particular utility vehicle, with the respective further motor vehicle, in particular utility vehicle, with regard to longitudinal and transverse guidance in the vehicle group, for example based on the type identifier.

The data may furthermore specify or rule out a rating, experience, capability and/or willingness to function as lead vehicle in the vehicle group.

The data may furthermore specify a load, in particular a hazardous material, a braking capability and/or an acceleration capability of the motor vehicle, in particular utility vehicle, of the respective journey. The match may comprise a compatibility of the load, of the braking capability and/or of the acceleration capability.

The match of N journeys for forming the vehicle group may furthermore comprise or require the presence of a driver for driving the respective motor vehicle, in particular utility vehicle, as lead vehicle and the presence of N−1 drivers for driving the one or more respective motor vehicles (in particular utility vehicles) as following vehicle.

The data may furthermore specify or identify a driver of the respective journey. The match may comprise or require a rating or experience of the respective driver for driving the lead vehicle in the vehicle group.

By way of example, the device and/or the central computer may sum the hours driven by the respective driver in a vehicle group. The experience may be based on the summed hours. The hours as driver of a lead vehicle and the hours as driver of a following vehicle may each be summed and/or rated separately. By way of example, the hours driven in a lead vehicle of a vehicle group may be weighted to a greater extent than the hours driven in a following vehicle of a vehicle group.

The received data of the further journey may relate to an existing vehicle group. A (for example only one) match may be output for the or each existing vehicle group. The output match may depend on a match between the recorded data of the journey of the motor vehicle, in particular utility vehicle, and the recorded data of the further journey of each further motor vehicle, in particular utility vehicle, in the existing vehicle group.

The received data may comprise a position of the further motor vehicle, in particular utility vehicle, and/or of the associated driver. Outputting the match may comprise displaying the position of the further motor vehicle, in particular utility vehicle, and/or of the associated driver on a map.

Outputting the match may comprise displaying a signal color in accordance with a color code of the match. A first color (for example red) may indicate a driver unavailable to form a vehicle group and/or a match that is not sufficient to form a vehicle group. A second color (for example green) may indicate a driver available to form a vehicle group and/or a match that is sufficient to form a vehicle group. A third color (for example yellow) may indicate an intermediate value between the match of the first signal color and the match of the second signal color. By way of example, the indicated position may be displayed in accordance with a color code that is a measure of the match resulting from the comparison.

A difference between a matching route and an optimum individual route of the motor vehicle, in particular utility vehicle, for an individual journey may reduce the match. The reduction may be dependent on (for example proportional to) an additional (for example temporal and/or spatial) length or an additional energy consumption (for example fuel consumption) of the matching route in comparison with the optimum individual route.

The comparison unit may furthermore be designed to determine the match on the basis of the recorded data of the journey of the motor vehicle, in particular utility vehicle, and the received data of the further journey of the at least one further motor vehicle, in particular utility vehicle.

The one or more motor vehicles, in particular utility vehicles, traveling behind in the vehicle group may be following vehicles of the vehicle group. The motor vehicle, in particular utility vehicle, traveling at the front of the vehicle group may be the lead vehicle of the vehicle group.

The device may be implemented by a mobile user apparatus and/or integrated in the motor vehicle, in particular utility vehicle. The mobile user apparatus may be a mobile telephone, a terminal or what is known as a "user equipment" (UE) in the sense of the Third Generation Partnership Project (3GPP).

The comparison unit may be implemented by an application executed by the mobile user apparatus and/or a control system installed in the vehicle. The radio unit may comprise a mobile radio interface of the mobile user apparatus or a radio interface of the motor vehicle (for example a dedicated radio interface for vehicle-to-vehicle communication). The user unit may be a touchscreen of the mobile user apparatus or a human-machine interface (HMI) arranged in a cockpit environment of the motor vehicle, in particular utility vehicle. The HMI may comprise a display of a combination instrument (or combi instrument for short) and multifunctional buttons of a steering wheel of the motor vehicle, in particular utility vehicle. As an alternative or in addition, the HMI may comprise a head-up display (HUD) or a touchscreen (for example of an infotainment system) on the central console of the motor vehicle, in particular utility vehicle.

The output (for example the display) of multiple matches for the further journeys of further motor vehicles (in particular utility vehicles) may be sorted in accordance with the respective match (for example in descending order).

As an alternative or in addition, the output (for example the display) of a match may require the received data of the further journey of the respective further motor vehicle, in particular utility vehicle, to meet at least one minimum requirement (for example a minimum value). The data of the journey of each motor vehicle, in particular utility vehicle, may each comprise driver information, vehicle information and/or journey route information (in particular the route and the associated travel times) of the respective journey.

The driver information may comprise a name of the driver, a telephone number of the driver, a (for example remaining) driving time of a driver, an expected break time of the driver, an expected resting time of the driver, driving experience of the driver in the motor vehicle (that is to say experience of the driver as driver of a motor vehicle, in particular as driver of the utility vehicle), driving experience of the driver in the vehicle group (that is to say experience of the driver as driver of a motor vehicle, in particular utility vehicle, in the vehicle group), driving experience of the driver in lead mode of the vehicle group (that is to say experience of the driver as driver of a lead vehicle in the vehicle group), a driving style of the driver, a rating of the driver by other drivers and/or (for example scheduled) additional tasks of the driver in the further motor vehicle, in particular utility vehicle, as following vehicle of the vehicle group. Each of said driving experiences of the driver in the further motor vehicle, in particular utility vehicle, may comprise driving hours experience and/or route experience or be measured in hours driven or distance driven.

The match between the routes, the associated travel times and/or the match between driving times may be combined (for example added).

The vehicle information of the motor vehicle, in particular utility vehicle, may comprise a vehicle type of the motor vehicle, an engine power of the motor vehicle, a maximum speed of the motor vehicle (for example on the basis of a fuel saving model), an acceleration capability of the motor vehicle, a braking capability of the motor vehicle, a tank size of a fuel tank of the motor vehicle, a capacity of an electric traction energy storage unit of the motor vehicle, a tank fill level of a fuel tank of the motor vehicle, a state of charge of an electric traction energy storage unit of the motor vehicle, a range of the motor vehicle (for example remaining based on the tank fill level and/or state of charge), a flow resistance coefficient of the motor vehicle, a weight or a mass (for example a load of the utility vehicle or of the loaded utility vehicle), a loading state of the motor vehicle (in particular utility vehicle), a functional scope of the radio interface and/or of the vehicle control system for driving in the vehicle group (in particular a functional scope of sensors or actuators for automated longitudinal and transverse guidance in the vehicle group), a type of load of the motor vehicle and/or belonging of the motor vehicle to a trucking company or to a vehicle fleet. The flow resistance coefficient may be determined in the form of a $c_W$ value and/or cross-sectional surface area perpendicular to the longitudinal axis of the respective motor vehicle. The weight of the motor vehicle, in particular utility vehicle, may comprise the overall weight including load. The type of load may comprise for example hazardous material. As an alternative or in addition, the vehicle information may comprise a maintenance state and/or a schedule for inspection of the motor vehicle, in particular utility vehicle, by a technical inspection organization (in particular TUV inspection, a German Technical Inspection Association, or general inspections).

The device may record the vehicle information of the motor vehicle, in particular utility vehicle, retrieve it for example from a non-volatile memory in the motor vehicle, in particular utility vehicle, and/or measure it by way of sensors. The sensor may be an acceleration sensor that measures the acceleration capability and/or the braking capability and/or a force sensor that measures an axle loading caused by the load.

The journey route information may comprise a destination, a scheduled route, planned intermediate stops, a remaining route and/or a provisional remaining travel time. The driving route may be a route (for example a path in space), route guidance (for example a sequence of instructions for lane changes) or a route profile (for example a trajectory in time and space).

The comparison unit and/or a central computer that exchanges data with the comparison unit (for example via the radio unit) may determine the match between the route (preferably the remaining route) of the motor vehicle, in particular utility vehicle, and the route (preferably the remaining route) of the or each further motor vehicle, in particular utility vehicle, and output it by way of the comparison unit (in particular display it by way of the HMI). The match between the routes may be determined on the basis of a length of the matching (that is to say common) route, a duration of the matching (that is to say common) route and/or a length of a deviation or of a time loss when the routes are compared. The length of the matching route and/or the duration may be weighted positively so as to determine the match, or the match may be a function that increases monotonically with the length and/or the duration. The length of the deviation and/or of the time loss may be weighted negatively so as to determine the match, or the match may be a function that falls monotonically with the length of the deviation and/or the time loss. As an alternative or in addition to the routes, the match may be determined on the basis of destinations.

The received data may furthermore comprise the driving time (preferably the remaining driving time) of the driver of the respective further motor vehicle, in particular utility vehicle. The recorded data may comprise a driving time (preferably a remaining driving time) of the driver of the motor vehicle, in particular utility vehicle. The match may depend on a comparison between the driving time of the driver of the respective further motor vehicle, in particular utility vehicle, and the driving time of the driver of the motor vehicle, in particular utility vehicle. By way of example, the match may depend on the minimum of the remaining driving times of the respective drivers. By way of example, the match between the driving times may be determined and displayed for one or more groups of further motor vehicles, in particular utility vehicles. As an alternative or in addition to the driving times, the match may be determined on the basis of break times and/or resting times.

While existing navigation systems do not take into account legally required breaks (for example of 15, 30 or 45 minutes), exemplary embodiments of the device allow a driving time optimization. To this end, the search parameters (in particular search criteria regarding the driver) may comprise the driving, break and resting times of the platooning partners, for example in order to maximize the route in terms of longest possible driving together or driving time saving.

The comparison unit and/or the central computer may be designed to determine clusters of further motor vehicles, in particular utility vehicles, as potential platooning partners and to display them (for example by way of the HMI). The clusters may be formed in accordance with the determined match. By way of example, platooning partners that exceed a minimum match with one another and in relation to the motor vehicle, in particular utility vehicle, form a cluster that is displayed by the comparison unit on the display unit as a vehicle group. The vehicle group may be formed through consent with the at least one displayed platooning partner or cluster.

The match may be indicated by a signal color. The signal color may be determined depending on or by the fact that the match exceeds a predetermined threshold value (also: minimum match). The signal colors may be designed in the form of traffic light colors. The signal color green may signal that the respective further motor vehicle (in particular utility vehicle) is suitable as a platooning partner for forming the vehicle group or the respective existing vehicle group is suitable for receiving the motor vehicle (for example as further following vehicle). The signal color yellow may signal that the respective further motor vehicle, in particular utility vehicle, or the respective existing vehicle group is suitable only for a relatively short time (for example measured in terms of the remaining route of the motor vehicle). The signal color red may signal that the respective further motor vehicle, in particular utility vehicle, is or has to remain in an individual driver mode (for example due to a hazardous material or shortly before leaving its route) or the respective existing vehicle group has reached a maximum length.

According to a further aspect, what is provided is a central computer. The central computer exchanges data with a base station of a mobile radio network or is able to exchange data with a base station of a mobile radio network. The central computer comprises a recording unit that is designed to record data of a journey from in each case multiple motor vehicles, in particular utility vehicles. The central computer furthermore comprises a comparison unit that is designed to determine at least one match between the recorded data of the journey from at least two motor vehicles, in particular utility vehicles, wherein the data comprise a route and associated travel times of the respective journey. The central computer furthermore comprises a transmission unit that is designed to transmit the determined match to the respective at least two motor vehicles (in particular utility vehicles).

According to a further aspect, what is provided is a motor vehicle, in particular utility vehicle, for example a non-railbound land vehicle. The motor vehicle, in particular utility vehicle, is designed for automated longitudinal and transverse guidance in a vehicle group and comprises a device according to one embodiment of the device aspect. The utility vehicle may be a bus, a truck or a traction machine (in particular a semitrailer machine).

Further features and advantages of the disclosure are described below with reference to the appended drawings, in which.

Figure 1:
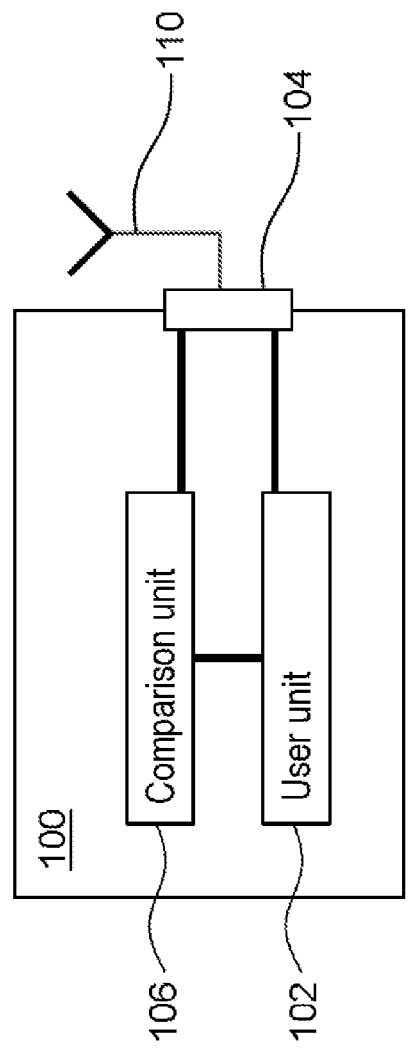
FIG. 1 shows a schematic block diagram of one exemplary embodiment of a device for comparing journeys of motor vehicles, in particular utility vehicles, so as to form a vehicle group.

FIG. 1 shows a schematic block diagram of one exemplary embodiment of a device, generally referenced using reference sign 100, for comparing journeys of motor vehicles, in particular utility vehicles, so as to form a vehicle group. The (for example already partially existing or still to be formed) vehicle group comprises a lead vehicle and at least one following vehicle guided longitudinally and transversely by the lead vehicle.

The device 100 comprises a user unit 102, a radio unit 104 and a comparison unit 106 that exchanges data with the user unit 102 and the radio unit 104.

The user unit 102 is designed to record data of a journey of a motor vehicle, in particular utility vehicle. The device may be used in relation to this motor vehicle (in particular utility vehicle), for example by a driver of the motor vehicle. To this end, the driver may input the data of the journey of the motor vehicle, in particular utility vehicle, on the user unit 102 and/or the device 100 installed in the motor vehicle, in particular utility vehicle, records the data (for example from a navigation system in the motor vehicle, in particular in the utility vehicle). The motor vehicle, in particular utility vehicle, may, when the vehicle group is formed, take over or perform the function of the lead vehicle or of the following vehicle therein.

The radio unit 104 is designed to receive data of a further journey from in each case at least one further motor vehicle, in particular utility vehicle. The radio unit 104 may comprise a radio interface (of a mobile telephone or of the motor vehicle, in particular of the utility vehicle), which is coupled or is able to be coupled electrically to an antenna 110. By way of example, the further motor vehicles comprise potential platooning partners separate from the motor vehicle. In relation to each of these further motor vehicles (in particular utility vehicles), an exemplary embodiment of the device may likewise be used (for example installed there), wherein the roles of the motor vehicle, in particular utility vehicle, and of the further motor vehicle, in particular utility vehicle, are swapped.

The comparison unit 106 is designed to output a match between the recorded data of the journey of the motor vehicle, in particular utility vehicle, and the received data of the further journey of the at least one further motor vehicle, in particular utility vehicle, on the user unit 102. The comparison unit 106 optionally determines or receives the match. The match is based on or corresponds to the recorded and received data that comprise a route and associated travel times of the respective journey.

The recorded data of the journey of the motor vehicle, in particular utility vehicle, and the received data of the further journey of the respective further motor vehicle, in particular utility vehicle, may each comprise features of the respective driver (driver information for short), features of the respective motor vehicle (in particular of the utility vehicle, vehicle information for short), features of the respectively scheduled route (journey route information for short, for example route and associated travel times) and/or features of an existing platoon (platoon information for short). The route may also be referred to as journey route.

The features of the driver or driver information may comprise his name and his telephone number, his remaining driving, resting and break times, his experience with driving in the vehicle group or platooning, his experience with leading a vehicle group or platoon, his driving experience (including in terms of driving hours, routes and/or frequency of journeys in the vehicle group or platoon), his previous driving style (including efficiency), his rating by other drivers (for example depending on degree of automation of the vehicle), his intended time for an additional task, for example for documentation and/or formalities for the journey.

The features of the motor vehicle, in particular utility vehicle, or vehicle information may comprise the make or the type of the motor vehicle, in particular utility vehicle, and/or its belonging to a haulier, a trucking company or a vehicle fleet. Alternative or additional features of the motor vehicle, in particular utility vehicle, may comprise vehicle parameters, in particular an engine power of the motor vehicle (in particular utility vehicle), an acceleration capability of the motor vehicle (in particular utility vehicle), a braking capability of the motor vehicle (in particular utility vehicle), size and/or fill level of the tank or of an electric traction energy storage unit of the motor vehicle (in particular utility vehicle), a flow resistance coefficient (for example a $c_W$ value) of the motor vehicle (in particular utility vehicle), a tare weight of the motor vehicle, in particular utility vehicle, and/or the weight of the motor vehicle, in particular utility vehicle, including additional load, a loading state of the motor vehicle (in particular utility vehicle) and/or the manner or the type of load (for example hazardous material) of the motor vehicle (in particular utility vehicle). In this case, emphasis may be placed on the respective mass rather than the weight. Features of the motor vehicle, in particular utility vehicle, may furthermore comprise the presence and/or a functional scope of the platooning technology (in particular longitudinal and transverse guidance), a maintenance state and/or a schedule for recurrent technical assessment (for example general inspection or TUV inspection).

The features of the scheduled journey route or journey route information may comprise a starting point of the journey route, a route profile of the journey route, scheduled intermediate stops on the journey route, the schedule destination of the journey route and/or the time of the scheduled journey route (for example a tour). The features of the scheduled journey route may also comprise a vicinity of the further motor vehicle, in particular utility vehicle, to the current location of the motor vehicle, in particular utility vehicle, and/or distance parameters. Distance parameters may in particular comprise the automated drivability of a road, a road type, the existence of tunnels, bridges, underpasses and/or roadworks or the road type (for example freeway, highway or country road).

The at least one further motor vehicle, in particular utility vehicle, may be a participant in an existing vehicle group (platoon), for example its lead vehicle. The recorded data may comprise features of the existing vehicle group, in particular a size of the vehicle group, a maximum number of motor vehicles (in particular utility vehicles) still to be received, information about participating vehicles (for example driver information, vehicle information and/or journey route information of the participating motor vehicles, in particular utility vehicles) of the vehicle group, a payment option (for example in favor of the lead vehicle and at the expense of the following vehicle), a duration of the common platoon journey and/or a calculated consumption saving.

The device 100 executes a method, for example an algorithm, in preparation for a platoon journey, in which the driver or another person (for example a dispatcher) is able to search for and select the best possible platooning partner for the vehicle group or an existing vehicle group for co-driving in accordance with the individual needs of said driver.

The search and selection is based on the recorded and received data, that is to say information, that are exchanged between the involved drivers and/or motor vehicles, in particular utility vehicles, by way of the radio unit 104, that is to say a suitable wireless communication interface (for example vehicle-to-vehicle, V2V, and/or vehicle-to-infrastructure, V2I).

The device, in particular the user unit, may be an input and output medium that is designed to record data of the journey of the motor vehicle, in particular utility vehicle (for example to query them from the driver or to obtain them directly from the motor vehicle, in particular utility vehicle) and to display the received data of the further journey of the at least one further motor vehicle, in particular utility vehicle, to the driver.

The comparison unit and/or the central computer may comprise hardware for data processing and/or for executing calculation algorithms for determining the match. The central computer may determine the match centrally for a large number of motor vehicles, in particular utility vehicles. The central computer may for example be a server.

The user unit 102, in order to search for the platooning partner, may display a search mask that is designed to record search parameters to the driver. The search parameters may comprise the recorded data of the journey of the motor vehicle (in particular utility vehicle), the at least one minimum requirement in terms of the received data and/or the minimum match. In response to the recording of the search parameters, the comparison unit 106 outputs a selection of potential platooning partners or existing platoons on the user unit so as to form a vehicle group that includes the motor vehicle, in particular utility vehicle.

The search may take place via a platform (for example spanning multiple utility vehicles and/or multiple utility vehicle manufacturers), this platform being formed for example by the central computer. The driver registers himself and his vehicle with the central computer by way of the user unit 102 and is able to select his platooning partners from a pool of registered further motor vehicles, in particular utility vehicles, and/or associated drivers. To this end, the central computer stores the data of the further motor vehicles (in particular utility vehicles) and/or their drivers.

The search parameters may comprise search criteria, for example the at least one minimum requirement or the minimum match. The best possible platooning partner and/or the best possible existing vehicle group, that is to say particular motor vehicles (in particular utility vehicles), particular vehicle combinations (for example stored or existing platoons) and/or particular drivers may be sought in accordance with various criteria. The driver uses the user unit to define the search criteria, in accordance with his requirements, prior to the search. The search criteria may be a search filter. The driver may furthermore weight or prioritize the search criteria. By way of example, an order of decreasing importance may be specified on the user unit.

The search criteria may be predefined (for example the selection from a criteria pool, a list from which the driver is able to select) or be specified individually by the driver. The driver may in particular define the number of search criteria himself.

The search criteria continue to serve as input parameters for determining the match, for example as input parameters for the calculation algorithm, and influence the result that is output.

The features of the respective driver (that is to say the driver information), the features of the respective motor vehicle (that is to say the vehicle information, in particular of the utility vehicle), the features of the respectively scheduled route (that is to say journey route information, for example route and associated travel times) and/or the features of an existing platoon (that is to say the platoon information) may be defined as a search criterion. By way of example, in each case a minimum requirement (that is to say an absolute criterion) and/or a minimum match (that is to say a relative criterion) may be input on the user unit 102 for various features (or properties) and/or stored in the comparison unit 106 and/or the central computer. As an alternative or in addition, the search criteria input by the driver may be stored on a memory card (for example a driver's card). When changing over into another vehicle, in particular utility vehicle, the driver is able to access his personal search criteria directly. The search criteria are preferably still able to be modified.

The user unit 102 displays the match (that is to say the search results) of the comparison unit 106, for example after the driver has defined his search criteria and the search has started.

If the determination of the match (that is to say the algorithm) found more than one hit, the results may be listed in weighted or prioritized form (for example in descending order with decreasing relevance). As an alternative or in addition, the comparison unit 106 outputs multiple platooning partners best suited to the data of the journey of the motor vehicle (for example to its own profile, in particular of the utility vehicle) as a narrower selection.

The driver may select his platooning partner, for example the one optimum for him, from the results list. The selection of a particular motor vehicle, in particular utility vehicle, or associated driver optionally leads to a message, to a call or another establishment of contact in the cockpit of the particular motor vehicle, in particular utility vehicle, or with the associated driver.

As an alternative or in addition, the comparison unit 106 displays the matching and/or selected platooning partners on a (for example existing) navigation map. These are able to continue to be stored in order to be taken into consideration at present or in future platoon journeys.

The comparison unit has the effect that a navigation system implements navigation of the motor vehicle, in particular utility vehicle, directly following the selection of the platooning partner for the fastest possible formation of the vehicle group (for example merging with the one or more selected platooning partners). To this end, the comparison unit and/or the navigation system may pre-calculate a location for merging (preferably without an intermediate stop) and navigate the motor vehicle, in particular utility vehicle, to the location of the merging point. This may additionally also be displayed on the vehicle's own display or information display.

The comparison unit 106 may initiate the establishment of contact with the selected platooning partner in response to the selection. By way of example, the user unit 102 indicates how the selected platooning partner would preferably like to be contacted, for example via email, telephone, radio, etc.

The driver may then establish contact with the selected platooning partner or platoon (for example the lead vehicle of the selected platoon or the last following vehicle in the selected platoon) and coordinate the onward travel of the motor vehicle, in particular utility vehicle, in the platoon.

As an alternative or in addition, the comparison unit 106 or the central computer (that is to say the search platform) may transmit a request directly to the selected platooning partner or the platoon. After the request has been accepted by the other side (that is to say consent to form the vehicle group), the comparison unit may initiate navigation to the location of the merging point and/or the onward travel in the vehicle group. By way of example, the user unit 102 indicates the route on which the selected platooning partner is best able to be reached.

In one advantageous exemplary embodiment, the at least one match may be displayed by way of a head-up display (as an example, the HMI instead of an infotainment system). Information about the journey may thus be displayed in the direct field of view of the driver when forming the vehicle group.

In order to determine the match, the comparison unit 106 and/or the central computer accesses a database. The database stores profiles of drivers, motor vehicles (in particular utility vehicles), hauliers, routes, etc. The database may be stored on a server (for example accessible centrally for a large number of exemplary embodiments of the device 100). The database is implemented for example in the central computer. As an alternative or in addition, the data in the database may be stored (at least in part) in the comparison unit (for example in the respective motor vehicle) and/or updated via the radio unit 104.

Upon each search request on the user unit 102, the data of the journey of the motor vehicle (in particular utility vehicle), that is to say the data about a driver, a motor vehicle, in particular utility vehicle, and/or a route schedule are transmitted to the database. In turn, received data of the further journey of potential platooning partners are transmitted back from the database to the requesting device 100 (for example the requesting motor vehicle) via the radio unit.

The device 100 may be installed in the respective motor vehicles, in particular utility vehicles, implemented by a mobile application executed by a mobile telephone and/or be implemented by a stationary application executed by a workplace computer.

Figure 2:
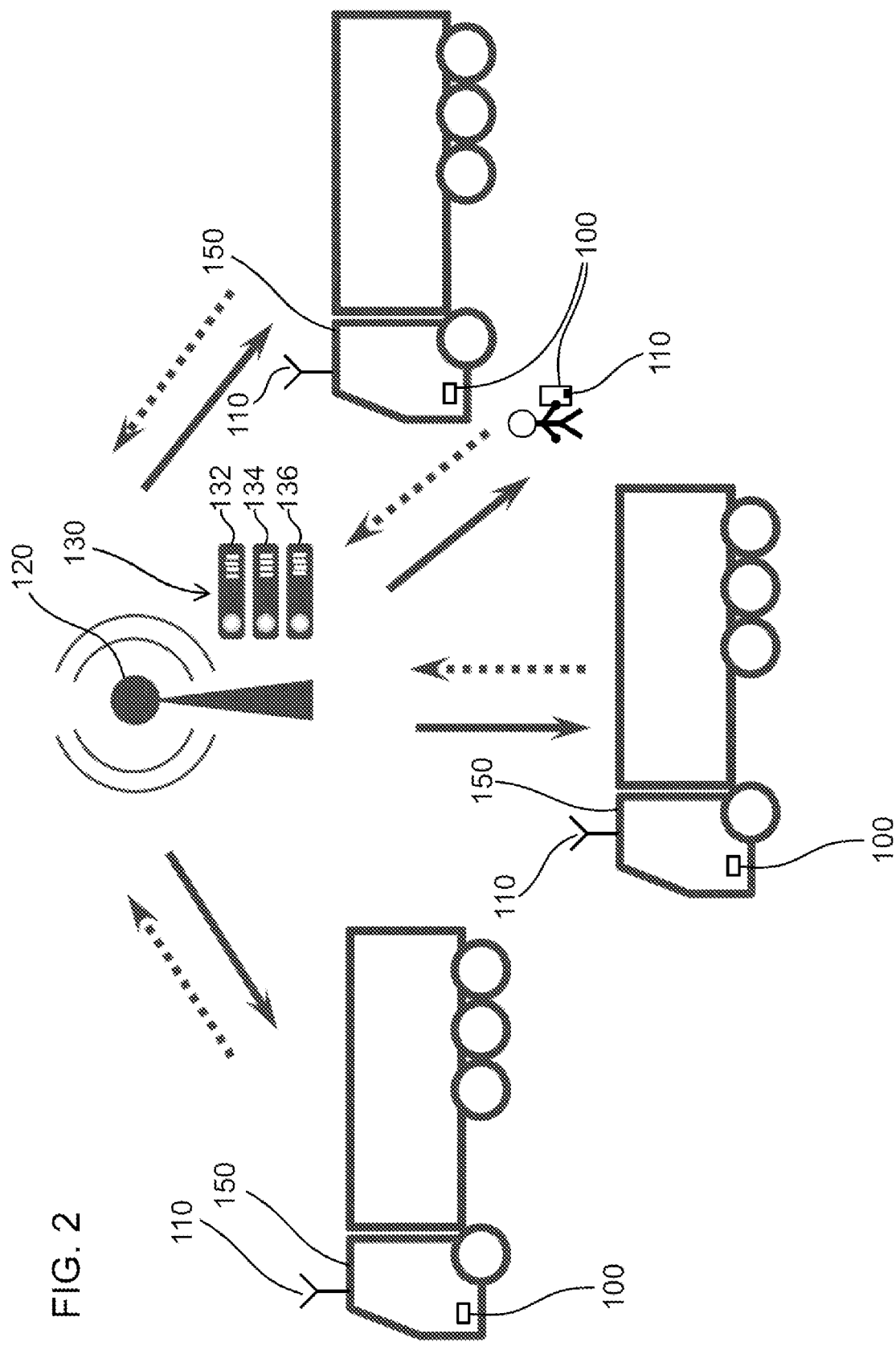
FIG. 2 shows a schematic illustration of a first example of a starting position for forming a vehicle group.

FIG. 2 shows a first example of a starting situation for forming a vehicle group. The device 100, for example the respective utility vehicle 150, uses the respective radio unit 104 to communicate with the central computer 130 via a base station 120. The same symbols or features having the same reference signs as in FIG. 1 denote interchangeable or alternative features.

A dashed arrow represents transmitted data, for example the recorded data about a driver, a motor vehicle, in particular utility vehicle, and/or route or the search parameters (in particular the search criteria). An unbroken arrow represents the received data.

The central computer 130 exchanges data with the base station 120 of a mobile radio network. The central computer 130 comprises a recording unit 132, a comparison unit 134 and a transmission unit 136.

The recording unit 132 is designed to record data of a journey from in each case multiple motor vehicles, in particular utility vehicles. The comparison unit 134 is designed to determine at least one match between the recorded data of the journey from at least two motor vehicles, in particular utility vehicles. The data comprise a route and associated travel times of the respective journey. The transmission unit 136 is designed to transmit the determined match to the respective at least two motor vehicles (in particular utility vehicles).

Figure 3:
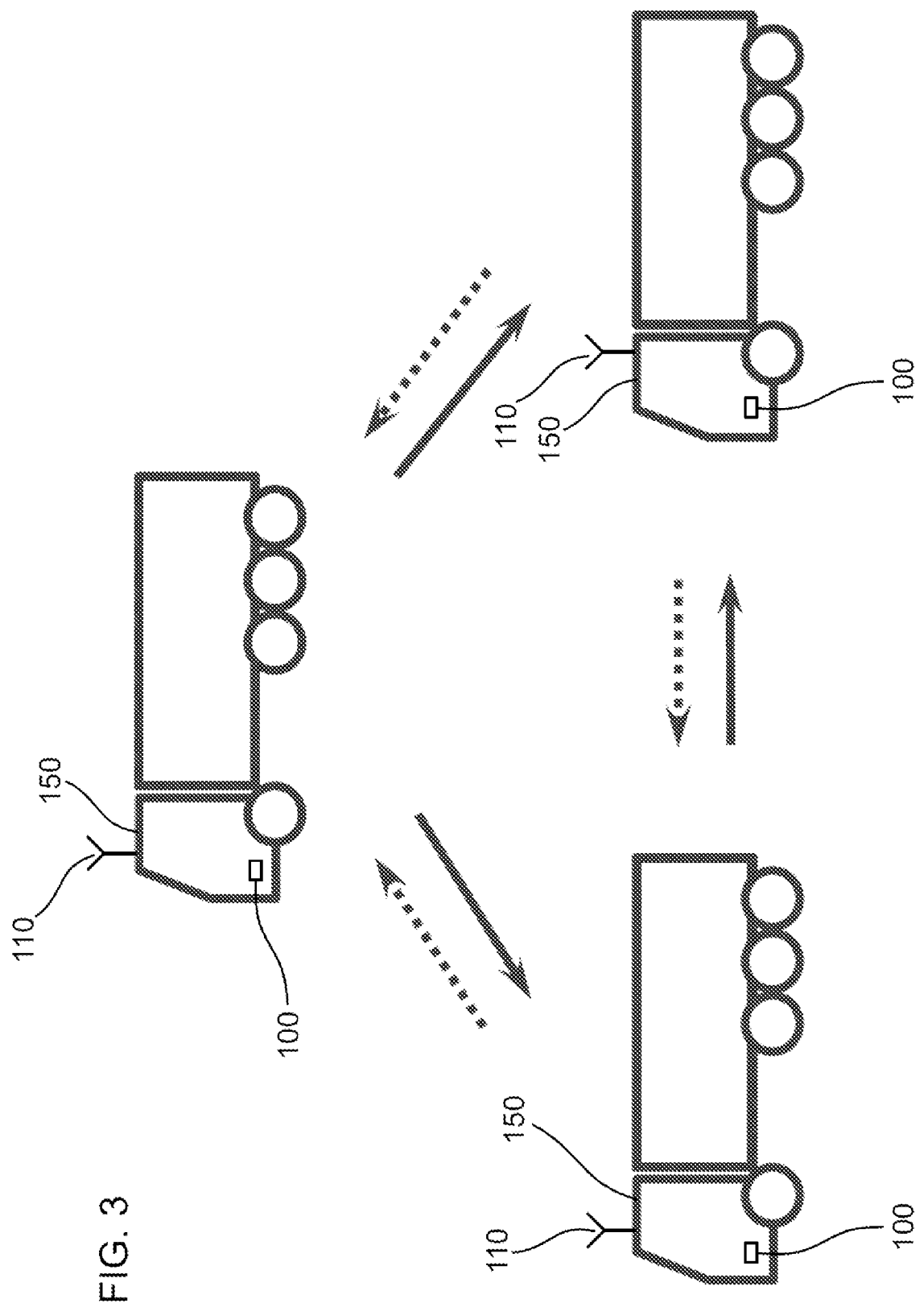
FIG. 3 shows a schematic illustration of a second example of a starting position for forming a vehicle group.

FIG. 3 shows a second example of a starting situation for forming a vehicle group, in which the devices 100 (for example the respective motor vehicles 150) communicate with one another (for example directly) by way of the radio unit 104. The same symbols or features having the same reference signs as in FIG. 1 or 2 denote interchangeable or alternative features.

Radio communication by way of the radio unit 104 (for example for receiving the data of the at least one further motor vehicle, in particular utility vehicle) may be a direct vehicle-to-vehicle (or V2V) radio connection, optionally with a control channel to a base station, in particular in accordance with 3GPP Licensed Assisted Access (LAA). FIG. 3 schematically shows exemplary embodiments of the device 100 in direct radio communication. The devices may be installed in a motor vehicle 150, in particular utility vehicle. The respective radio unit 104 is optionally connected to its antenna 110 so as to exchange radio signals.

The search for the platooning partner by way of the device 100 may be started before the beginning of the journey, such that the driver searches for a suitable platooning partner while the vehicle is stationary. As an alternative or in addition, the search may be started or supplemented during the journey. The driver receives an indication as to the resting area or as to the nearby area in which the platooning partner is located. Long-term scheduling of platooning journeys, in particular of the location and of the time of the merging, is thus possible.

Figure 4:
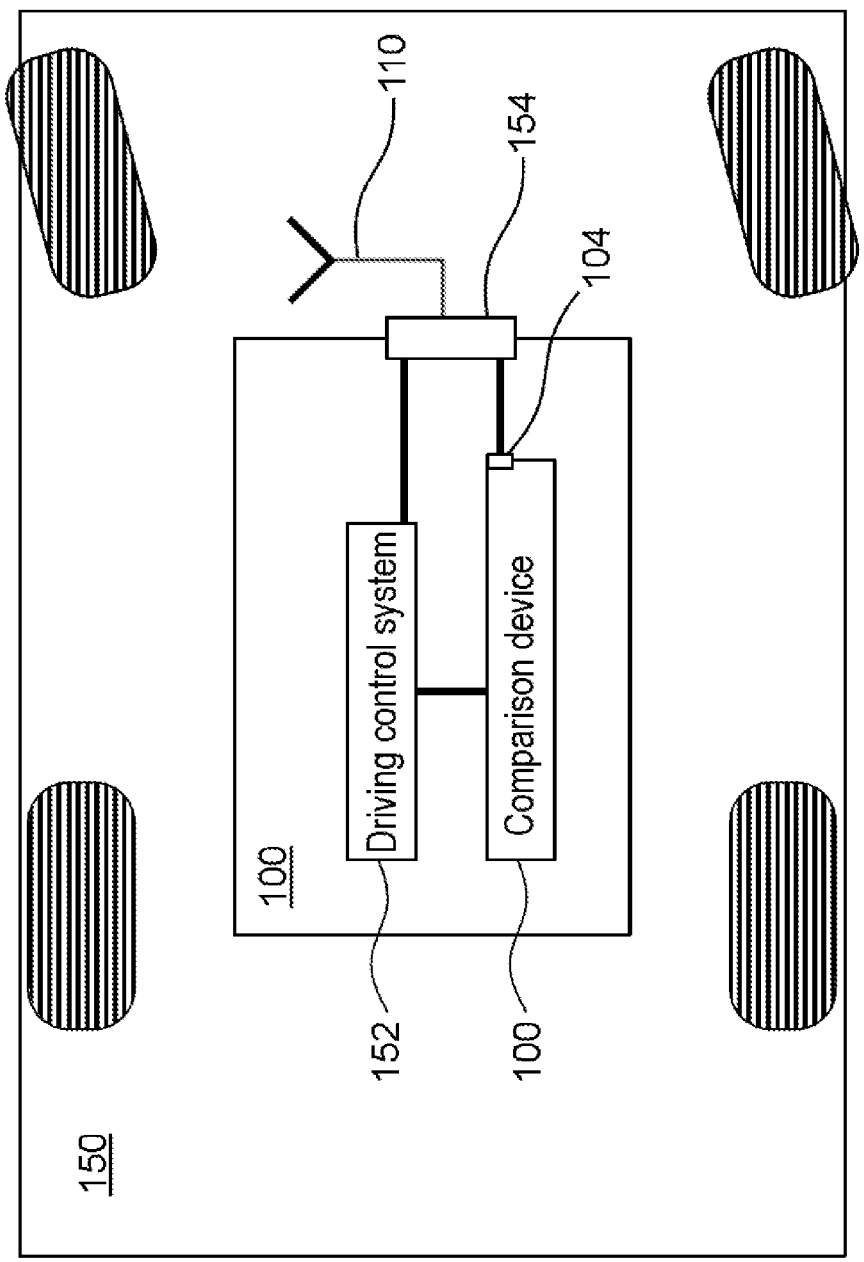
FIG. 4 shows a schematic illustration of one example of an installation situation of a device from FIG. 1 in a motor vehicle, in particular in a utility vehicle.

FIG. 4 shows one example of an installation situation of one exemplary embodiment of the device 100 in a motor vehicle 150, in particular in a utility vehicle. The motor vehicle 150, in particular utility vehicle, is able to establish a radio connection with at least one further motor vehicle (in particular utility vehicle), for example within or outside the vehicle group, via the radio interface 154. Two or more exemplary embodiments of the motor vehicle 150, in particular utility vehicle, in the vehicle group may in particular exchange control signals of the driving control system 152. Camera images may furthermore be exchanged via the radio interface 154. The camera images may concern the exterior camera of the lead vehicle, of the following vehicles or the interior cameras, for example for video conversations.

The radio interface 154 may comprise a radio modem, an antenna booster and/or an antenna 110, or be electrically coupled thereto in order to exchange radio signals, for example in accordance with a radio access technology from 3GPP, in particular in accordance with "Long Term evolution" (LTE) or "New Radio" (NR).

The driving control system 152 comprises a control system for the automated longitudinal and transverse guidance of the motor vehicle 150, in particular of the utility vehicle. To this end, the driving control system 152 may record the position and the speed (for example the relative speed) of the motor vehicle, in particular utility vehicle, traveling directly in front in the vehicle group, for example by way of a radar sensor.

The driving control system 152 furthermore exchanges signals with a radio interface 154 of the motor vehicle 150, in particular utility vehicle, and is designed, in a lead mode (that is to say when the motor vehicle is lead vehicle), to transmit control signals for the automated longitudinal and transverse guidance of the motor vehicle 150, in particular utility vehicle, to at least one vehicle traveling behind, in particular utility vehicle, in the vehicle group and, in a following mode (that is to say when the motor vehicle is following vehicle), to receive control signals for the automated longitudinal and transverse guidance of the motor vehicle 150, in particular utility vehicle, from at least one motor vehicle traveling in front in the vehicle group.

The comparison device 100 may exchange signals with the driving control system 152. By way of example, the comparison device 100 may configure the drive control system 152 with the received data of the at least one further motor vehicle, in particular utility vehicle, in response to the consent to form a vehicle group. By way of example, a cruise control system of the driving control system may depend on the braking capability or acceleration capability of the further motor vehicle, in particular utility vehicle.

The motor vehicles 150 of the vehicle group may also be referred to as platoon vehicles, platooning partners or platooning participants. Information about highly automated driving functions may be recorded by sensors installed in the respective motor vehicle 150, for example cameras, laser scanners, the radar sensor, ultrasound sensors and/or a receiver of a global navigation satellite system (for example a GPS receiver) and made available to the respective driving control system 152.

The comparison unit 106 may be designed to store a selection of possible platooning partners 150, for example in order to take them into consideration at present and/or in future journeys in the vehicle group.

As an alternative or in addition, the comparison unit 106 may be designed, for platooning partners 150 whose match is greater than or equal to a minimum match, which meet another of the criteria (for example based on a scheduled destination or a remaining driving time) and/or known (for example stored) platooning partners, to derive and/or to display suggestions as to how these may be integrated into the journey route of the motor vehicle 150, in particular utility vehicle, or the modified route on which the vehicle group is able to be formed. The suggestions may comprise for example starting point, driving time or intermediate stops.

In each exemplary embodiment, the input and display of the information (for example the data or the match) may be output on the screen of the infotainment system or integrated into the infotainment system.

The device 100, in particular the user unit 102, may be available on a mobile terminal (for example a mobile telephone or a tablet computer) in the form of an application (or "app" for short).

Furthermore, in each exemplary embodiment, the device 100 may assign the distance traveled in the vehicle group, in particular the distance traveled as lead vehicle, to the respective motor vehicle (in particular utility vehicle), the associated driver and/or the associated trucking company, for example for a reward or remuneration system. Each coupling (that is to say formation of a vehicle group through merging or joining up) is reported automatically to all of the motor vehicles 150 of the vehicle group and/or to the central computer 130. The reported data comprise the time traveled in the vehicle group (for example minutes) and/or the distance traveled in the vehicle group (for example kilometers).

By way of example, the comparison unit 106 and/or central computer 130 stores account data relating to the respective motor vehicle (in particular utility vehicle), the associated driver and/or the associated trucking company. The account data comprise a current driving time in the platoon and/or the kilometers traveled by the respective motor vehicle (in particular utility vehicle), by the associated driver and/or by the associated trucking company. The lead vehicle receives a benefit share. The lead vehicle is remunerated separately on the basis of the account data for the energy or fuel saving of the following vehicles.

All of the platooning participants 150 may retrieve an information graphic on their respective user unit 102, in which all of the platooning information (for example length, duration, position, fuel saving, etc.) is displayed by the comparison unit 106. These data are stored on the central computer 120 (in particular the platform or the server) and may be taken into consideration as a search criterion.

In one exemplary embodiment, a driver, in particular a truck driver, schedules his daily route early in the morning before starting his journey, that is to say the route and the associated travel times of the motor vehicle 150, in particular the utility vehicle. His destination is a few hundred kilometers away and he has a long distance to cover on the freeway. In order to cover the long distance with the least possible consumption, the driver wishes, where possible, to drive in a platoon. To this end, the driver starts an application (or "app") implemented on the device 100 in the infotainment system and enters the search criteria (for example route, driving experience) for an optimum platooning partner. His driver information and vehicle information is already stored (in the motor vehicle 150 and/or in the central computer 130) by virtue of previous use (for example over many years) of the device 100.

In the exemplary embodiment, the comparison unit 106 outputs to the driver N suggestions (for example N=20) of possible further motor vehicles 150 (for example further drivers) as the match on the user unit 102. The driver sorts through the results and prompts the comparison unit to sort the results in accordance with one of the search criteria, for example a rating of the driver.

Each exemplary embodiment may be supplemented such that a rating of the driver is created by way of the device 100. To this end, the user unit 102 may record a rating of the further drivers and transmit it to the database of the central computer 130.

The driver selects, for example in accordance with his specification, the best driver as a platooning partner from the displayed suggestions. The driver then establishes contact with the selected driver, for example via the app. The selected (also: addressed) driver, who is likewise driving alone, accepts the request through consent on his device 100. The navigation system in the motor vehicle 150, in response to the location of the merging point as signaled by the comparison unit 106, searches for the optimum route in order to form the vehicle group as quickly as possible.

In a further exemplary embodiment, a truck driver is driving on his own on the freeway. The driver receives a request via his infotainment system, as an example of the user unit 102, as to whether he would like to join a platoon. He uses his user unit 102, for example the app, to look for data about the platoon. He sees that the platoon consists of three trucks containing hazardous material. He also reads the information about the driving experience and the kilometers that the drivers involved have traveled in the platoon. He weighs up the possible fuel saving, which is likewise displayed to him on the app, in the platoon against that of the journey on his own. His "gut instinct" decides against traveling in a platoon, since the drivers are too inexperienced for him. He declines the request and awaits the next time window to join a platoon or to create a platoon.

On the basis of the exemplary implementations and exemplary embodiments described herein, it is able to be seen that exemplary embodiments of the device 100 allow more efficient adjustment and organization of platoon journeys.

Platooning partners are able to be matched to one another in an optimum manner on the basis of multiple search criteria. The fuel saving is thereby able to be increased.

The platoon journey may also be scheduled by the driver in a simpler manner. A common route of the platoon journey is in particular able to be scheduled better. Platooning partners may thereby travel with one another for a longer time.

When forming the platoon, vehicle properties may be taken into consideration and matched with one another. This likewise increases the efficiency of a platoon journey.

The confidence in a platoon journey may be increased by individually selecting the platooning partner. The drivers receive additional knowledge about their co-drivers and thus feel more "comfortable" during the platoon journey.

The device may output a preliminary selection of potential platooning partners. The driver may additionally make the final selection (for example the one optimum for him) of the platooning partner.

Although described with reference to exemplary embodiments, it is obvious to a person skilled in the art that various amendments may be made and equivalents may be used as a substitute. Furthermore, it is possible to make many modifications in order to adapt a particular application of the device or a particular driving environment to the teaching of the disclosure. The disclosure is therefore not restricted to the disclosed exemplary embodiments, but rather encompasses all exemplary embodiments that fall within the scope of the appended patent claims.

LIST OF REFERENCE SIGNS

100 device for comparing journeys of motor vehicles, comparison device for short
102 user unit
104 radio unit
106 comparison unit
110 antenna of the radio unit, in particular vehicle antenna
120 base station
130 central computer
132 recording unit of the central computer
134 comparison unit of the central computer
136 transmission unit of the central computer
150 motor vehicle, in particular utility vehicle
152 driving control system
154 radio interface

The invention claimed is:

1. A device for comparing journeys of motor vehicles, so as to form a vehicle group with a lead vehicle and at least one following vehicle guided longitudinally and transversely by the lead vehicle, comprising:
a user unit that is designed to record data of a journey of a motor vehicle;
a radio unit that is designed to receive data of a further journey from in each case at least one further motor vehicle, wherein the received data of the further journey relate to an existing vehicle group; and
a comparison unit that exchanges data with the user unit and the radio unit that is designed to output a match between the recorded data of the journey of the motor vehicle and the received data of the further journey of the at least one further motor vehicle on a user interface, wherein only one match is output for the existing vehicle group, and wherein the output match depends on a match between the recorded data of the journey of the motor vehicle and the received data of the further journey of each further motor vehicle in the existing vehicle group,
wherein the data comprise a route and associated travel times of the respective journey, wherein the data furthermore specify a driver of the respective journey and at least one of a load, a braking capability and an acceleration capability of the motor vehicle of the respective journey, and wherein the match comprises an experience of the respective driver for driving the lead vehicle in the vehicle group, wherein the device is designed to sum the hours driven by the respective driver in a vehicle group and the experience is based on the summed hours, and the match further comprises at least one of a compatibility of the load, of the braking capability and of the acceleration capability,
wherein the device is furthermore designed, in response to the outputting of the match with the at least one further motor vehicle, to record consent to form the vehicle group with the at least one further motor vehicle and to transmit the recorded consent to the at least one further motor vehicle by way of the radio unit, wherein the device is furthermore designed, in response to the recorded consent, to configure a control system of the motor vehicle to perform longitudinal and transverse guidance on the basis of the received data of the at least one further motor vehicle.

2. The device as claimed in claim 1, wherein:
the motor vehicle is a utility vehicle; or
the at least one further motor vehicle is a utility vehicle.

3. The device as claimed in claim 1, wherein the radio unit exchanges control data with a control system of the motor vehicle for longitudinal and transverse guidance and is furthermore designed to receive the control data for the longitudinal and transverse guidance from the lead vehicle or to transmit them to the at least one following vehicle.

4. The device as claimed in claim 1, wherein the radio unit receives the data of the further journey and/or consent directly from the respective further motor vehicle, and/or wherein the radio unit is furthermore designed to transmit the recorded data and/or recorded consent directly to the respective further motor vehicle.

5. The device as claimed in claim 1, wherein the radio unit receives the data of the further journey and/or consent of the at least one further motor vehicle from a central computer, and/or wherein the user unit is furthermore designed to transmit the recorded data and/or the consent to the central computer.

6. The device as claimed in claim 1, wherein the comparison unit is designed to output matches with multiple further motor vehicles in a manner sorted in accordance with a degree of the respective match.

7. The device as claimed in claim 1, wherein the data furthermore specify a motor vehicle or a vehicle type of the respective journey, and wherein a match comprises a compatibility of the respective motor vehicles for longitudinal and transverse guidance in the vehicle group.

8. The device as claimed in claim 1, wherein the load is a hazardous material and/or the motor vehicle is a utility vehicle and/or the at least one further motor vehicle is a utility vehicle.

9. The device as claimed in claim 8, wherein the load is a hazardous material.

10. The device as claimed in claim 1, wherein the received data comprise a position of the further motor vehicle, and/or of the associated drive, and wherein outputting the match comprises displaying the position of the further motor vehicle and/or of the associated driver on a map.

11. The device as claimed in claim 1, wherein a difference between a matching route and an optimum individual route of the motor vehicle for an individual journey reduces the match.

12. The device as claimed in claim 1, wherein the comparison unit is furthermore designed to determine the match on the basis of the recorded data of the journey of the motor vehicle and the received data of the further journey of the at least one further motor vehicle.

13. A central computer that exchanges data with a base station of a mobile radio network and comprises:
   a recording unit that is designed to record data of a journey from in each case multiple motor vehicles, wherein the multiple motor vehicles form an existing vehicle group;
   a comparison unit that is designed to determine a match between the recorded data of the journey from at least two motor vehicles, wherein only one match is determined for the existing vehicle group, and wherein the determined match depends on a match between the recorded data of each journey of each of the motor vehicles in the existing vehicle group, wherein the data comprise a route and associated travel times of the respective journey, wherein the data furthermore specify a driver of the respective journey and at least one of a load, a braking capability and an acceleration capability of the motor vehicle of the respective journey, and wherein the match comprises an experience of the respective driver for driving the lead vehicle in the vehicle group, wherein the comparison unit is designed to sum the hours driven by the respective driver in a vehicle group and the experience is based on the summed hours, and the match further comprises at least one of a compatibility of the load, of the braking capability and of the acceleration capability; and
   a transmission unit that is designed to transmit the determined match to the respective at least two motor vehicles,
   wherein the central computer is furthermore designed, in response to the transmitting of the determined match to the respective at least two motor vehicles, to receive consent from at least one of the at least two motor vehicles to form a vehicle group with the at least two motor vehicles and to transmit the received consent to at least one further motor vehicle of the at least two motor vehicles by way of the transmission unit, wherein in response to the received consent, the received data of the at least one further motor vehicle is used to configure a control system of the motor vehicle to perform longitudinal and transverse guidance.

14. The central computer as claimed in claim 13, wherein:
   the multiple motor vehicles are utility vehicles; or
   the at least two motor vehicles are utility vehicles.

15. A motor vehicle which is designed for automated longitudinal and transverse guidance in a vehicle group, comprising:
   a device for comparing journeys of motor vehicles, so as to form a vehicle group with a lead vehicle and at least one following vehicle guided longitudinally and transversely by the lead vehicle, including:
      a user unit that is designed to record data of a journey of a motor vehicle;
      a radio unit that is designed to receive data of a further journey from in each case at least one further motor vehicle, wherein the received data of the further journey relate to an existing vehicle group; and
      a comparison unit that exchanges data with the user unit and the radio unit that is designed to output a match between the recorded data of the journey of the motor vehicle and the received data of the further journey of the at least one further motor vehicle on a user interface, wherein only one match is output for the existing vehicle group, and wherein the output match depends on a match between the recorded data of the journey of the motor vehicle and the received data of the further journey of each further motor vehicle in the existing vehicle group,
      wherein the data comprise a route and associated travel times of the respective journey, wherein the data furthermore specify a driver of the respective journey and at least one of a load, a braking capability and an acceleration capability of the motor vehicle of the respective journey, and wherein the match comprises an experience of the respective driver for driving the lead vehicle in the vehicle group, wherein the device is designed to sum the hours driven by the respective driver in a vehicle group and the experience is based on the summed hours, and the match further comprises at least one of a compatibility of the load, of the braking capability and of the acceleration capability, wherein the device is furthermore designed, in response to the outputting of the match with the at least one further motor vehicle, to record consent to form the vehicle group with the at least one further motor vehicle and to transmit the recorded consent to the at least one further motor vehicle by way of a radio unit, wherein the device is furthermore designed, in response to the recorded consent, to configure a control system of the motor vehicle to perform longitudinal and transverse guidance on the basis of the received data of the at least one further motor vehicle; or
   a central computer that exchanges data with a base station of a mobile radio network, including:
      a recording unit that is designed to record data of a journey from in each case multiple motor vehicles, wherein the multiple motor vehicles form an existing vehicle group;
      a comparison unit that is designed to determine a match between the recorded data of the journey from at least two motor vehicles, wherein only one match is determined for the existing vehicle group, and wherein the determined match depends on a match between recorded data of each journey of each of the motor vehicles in the existing vehicle group, wherein the data comprise a route and associated travel times of the respective journey, wherein the data furthermore specify a driver of the respective journey and at least one of a load, a braking capability and an acceleration capability of the motor vehicle of the respective journey, and wherein the match comprises an experience of the respective driver for driving the lead vehicle in the vehicle group, wherein the comparison unit is designed to sum the hours driven by the respective driver in the vehicle group and the experience is based on the summed hours, and the match further comprises at least one of a compatibility of the load, of the braking capability and of the acceleration capability; and a transmission unit that is designed to transmit the determined match to the respective at least two motor vehicles, wherein the central computer is furthermore designed, in response to the transmitting of the determined match to the respective at least two motor vehicles, to receive consent from at least one of the at least two motor vehicles to form a vehicle group with the at least two motor vehicles and to transmit the received consent to at least one further motor vehicle of the at least two motor vehicles by way of the transmission unit, wherein in response to the received consent, the received data of the at least one further motor vehicle is used to configure a control system of the motor vehicle to perform longitudinal and transverse guidance.

16. The motor vehicle as claimed in claim 15, wherein the motor vehicle is a utility vehicle.

\* \* \* \* \*